United States Patent [19]
Peyser et al.

[11] 3,968,375
[45] July 6, 1976

[54] X-RAY CASSETTE HOLDER

[75] Inventors: Leonard F. Peyser, Briarcliff Manor, N.Y.; Roger L. Hibbert, Bethel, Conn.

[73] Assignee: The Machlett Laboratories, Incorporated, Stamford, Conn.

[22] Filed: Dec. 13, 1974

[21] Appl. No.: 532,346

[52] U.S. Cl. .............................. 250/468; 250/521
[51] Int. Cl.² ............................................ G03B 41/16
[58] Field of Search .......... 250/468, 470, 471, 511, 250/512, 513, 521, 444, 445, 446, 447, 448, 449

[56] References Cited
UNITED STATES PATENTS

| | | | |
|---|---|---|---|
| 3,518,435 | 6/1970 | Kok | 250/511 |
| 3,694,653 | 9/1972 | Allard | 250/468 |
| 3,771,781 | 11/1973 | Lackey | 250/468 |
| 3,792,283 | 2/1974 | Lebra | 250/468 |
| 3,801,789 | 3/1974 | James | 250/468 |
| 3,826,922 | 7/1974 | Ingles | 250/471 |
| 3,829,698 | 8/1974 | Goetz | 250/468 |

*Primary Examiner*—Craig E. Church
*Attorney, Agent, or Firm*—John T. Meaney; Joseph D. Pannone; Harold A. Murphy

[57] ABSTRACT

An X-ray cassette holder having adjustable track means for slidably receiving a film cassette and positioning it longitudinally, the holder also including automatic clamping means locked in the open position and actuated by insertion of the cassette to close on opposing sides thereof for centering the cassette transversely in the holder.

8 Claims, 8 Drawing Figures

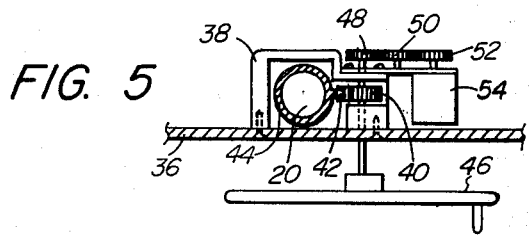
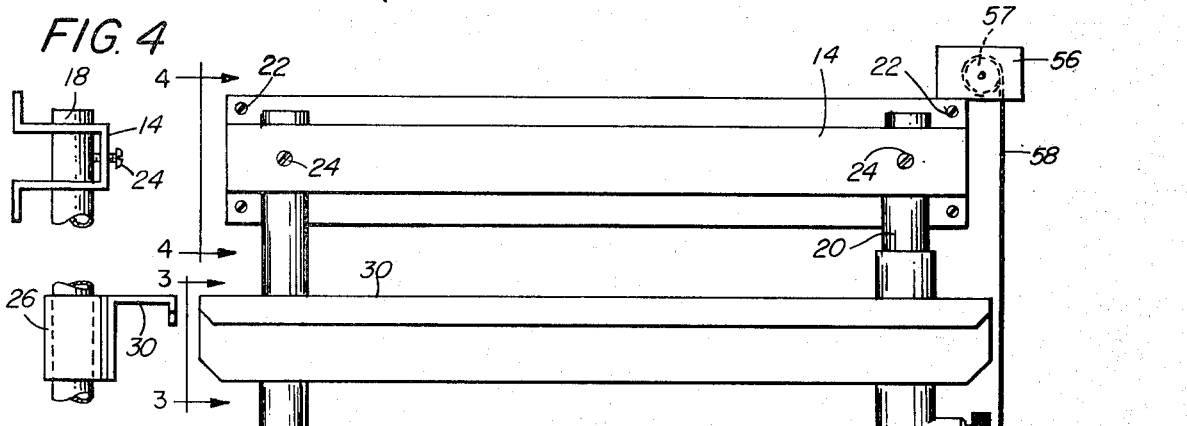
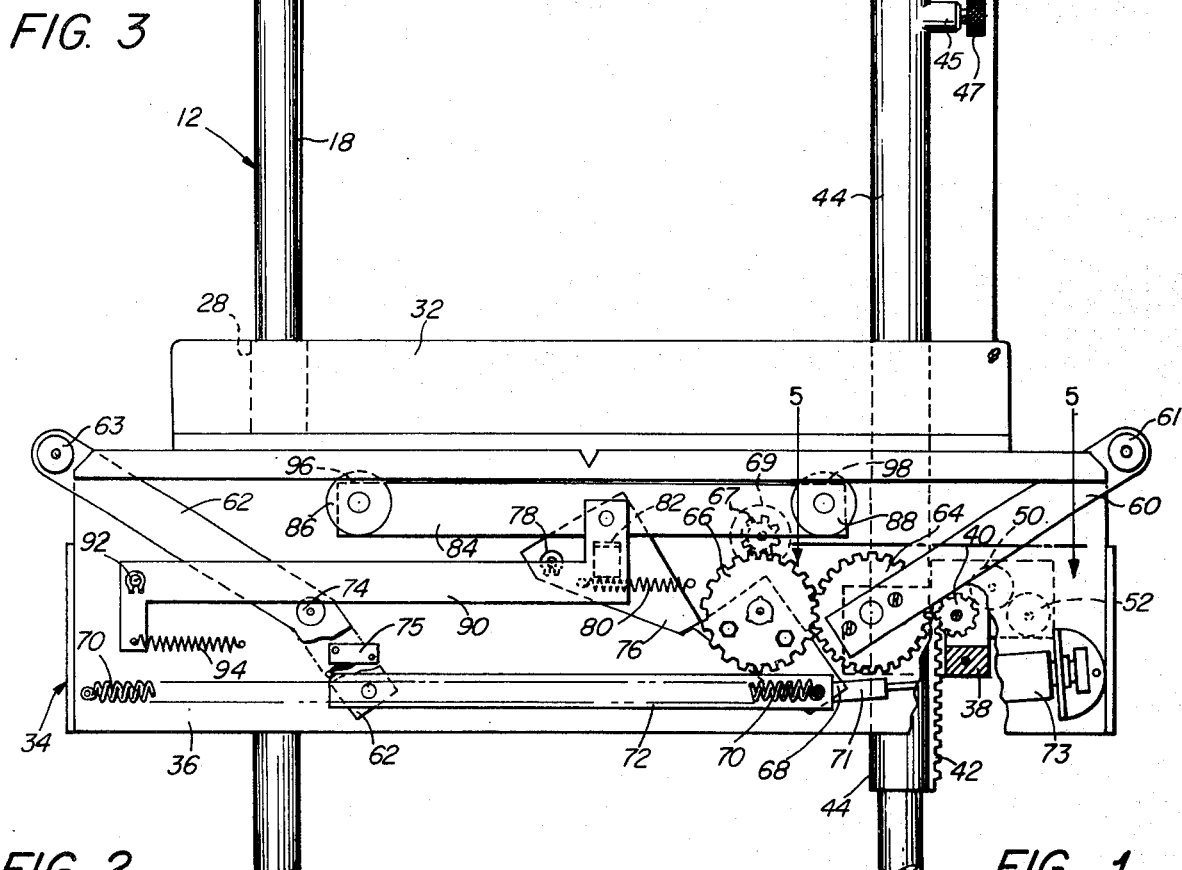
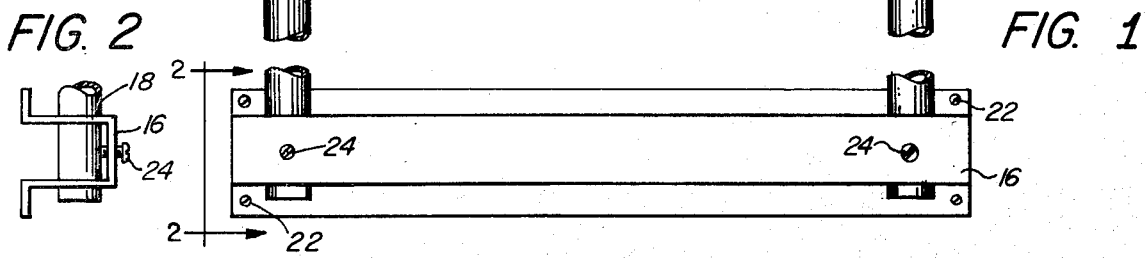

X-RAY CASSETTE HOLDER

BACKGROUND OF THE INVENTION

This invention relates generally to X-ray apparatus and is concerned more particularly with an X-ray film cassette holder having means for centering a film cassette in the holder.

In some X-ray diagnostic procedures, such as examinations of the chest, for example, a selected portion of a patient's body is positioned adjacent an aligned film in a vertically supported cassette. Generally, the cassette is slidably inserted into one side of an upright holder, such as a wall holder, for example, which has means for positioning the cassette longitudinally as desired. An X-ray source is operatively disposed for directing an X-ray beam through the selected portion of the patient and onto the aligned film. As a result, the beam is modified by the internal structure of the selected portion and produces a shadow image thereof on the film.

In order to minimize exposure of the patient to unnecessary X-radiation, it is required that the irradiated portion of the patient correspond substantially to the area of the aligned film. Since films of various sizes may be installed in the described holder, it is desirable that adjustable means be provided for controlling the cross-sectional size of the X-ray beam. Consequently, there may be disposed between the X-ray source and the patient a beam collimator device having adjustable shutters made of X-ray absorbent material for defining an aperture through which the beam passes. Thus, by adjusting the shutter aperture the diverging X-ray beam is provided with a cross-sectional size which conforms substantially to the area of the film, at the plane of the film.

However, even when the incident cross-sectional size of the X-ray beam is adjusted as described, the patient still may be irradiated unnecessarily due to the X-ray film cassette not being centered transversely in the holder. Thus, some of the X-rays passing through the selected portion of the patient may not impinge on the off-center film and, consequently, will serve no useful purpose. Generally, it is left to the operator or X-ray technician to center the film cassette in the holder visually, as by aligning a scribe mark on the cassette with a notch in the holder, for example. Also, there may be occasions when it is preferable that the patient not be required to move while taking a plurality of exposures.

Therefore, it would be advantageous to provide an X-ray cassette holder with automatic means for transversely centering a film cassette installed in the holder.

SUMMARY OF THE INVENTION

Accordingly, this invention provides a cassette holder having adjustable track means for slidably receiving a film cassette and positioning it longitudinally in the holder, and automatic clamping means actuated by insertion of the cassette to close on opposing sides thereof with sufficient force to center the cassette transversely in the holder.

The cassette holder may be of the wall mounted type, for example, having a generally rectangular frame including a longitudinally extending pair of spaced parallel support rods. A transversely extending pair of opposing guide tracks are mounted for movement as a unit along the support rods, and are provided with suitable locking means for maintaining the tracks in a selected position on the support rods. Operatively coupled to the tracks is an adjustable means for spacing the tracks apart a sufficient distance to achieve slidable engagement with respective edges of a film cassette inserted therebetween. The adjustable means may be suitably connected to an electrical sensing means for measuring the associated dimension of the installed cassette and for producing a corresponding output signal.

The clamping means comprises a pivotally mounted pair of spaced clamping arms having respective proximal end portions operatively coupled to a spring loaded rotatable means which is suitably connected to an electrical sensing means. With no cassette in the holder, the opposing distal ends of the clamping arms are disposed adjacent respective ends of the lower guide track and slightly above the level thereof. The rotatable means is lockingly engaged by a pivotal latch member having a portion operatively disposed adjacent a suitable actuating means. The actuating means includes a bar carrying a pair of spaced rollers having respective chordal portions resiliently urged through aligned slots in the lower guide track.

In operation, a cassette is inserted into the lower guide track by slightly depressing the distal end of the adjacent clamping arm thereby causing the rotating means to free the latch member for subsequent disengagement. Continued insertion of the cassette depresses the first encountered roller and then the second encountered roller of the actuating means. As a result, the actuating means pivots the latch member to unlock the rotating means which then resiliently urges the distal ends of the clamping arms to swing toward one another over the lower guide track. Consequently, the distal ends of the clamping arms engage respective opposing sides of the inserted cassette and center it transversely in the holder. Also, the sensing means measures the extent of rotation of the clamping arms and produces a corresponding output signal.

BRIEF DESCRIPTION OF THE DRAWINGS

For a better understanding of this invention, the following more detailed description makes reference to the accompanying drawings wherein:

FIG. 1 is a schematic front elevational view of a wall type cassette holder embodying the invention;

FIG. 2 is a fragmentary side elevational view taken along line 2—2 in FIG. 1 and looking in the direction of the arrows;

FIG. 3 is a fragmentary side elevational view taken along line 3—3 in FIG. 1 and looking in the direction of the arrows;

FIG. 4 is a fragmentary side elevational view taken along line 4—4 in FIG. 1 and looking in the direction of the arrows;

FIG. 5 is a fragmentary sectional view taken along line 5—5 in FIG. 1 and looking in the direction of the arrows;

DESCRIPTION OF THE PREFERRED EMBODIMENT

Figure 6:
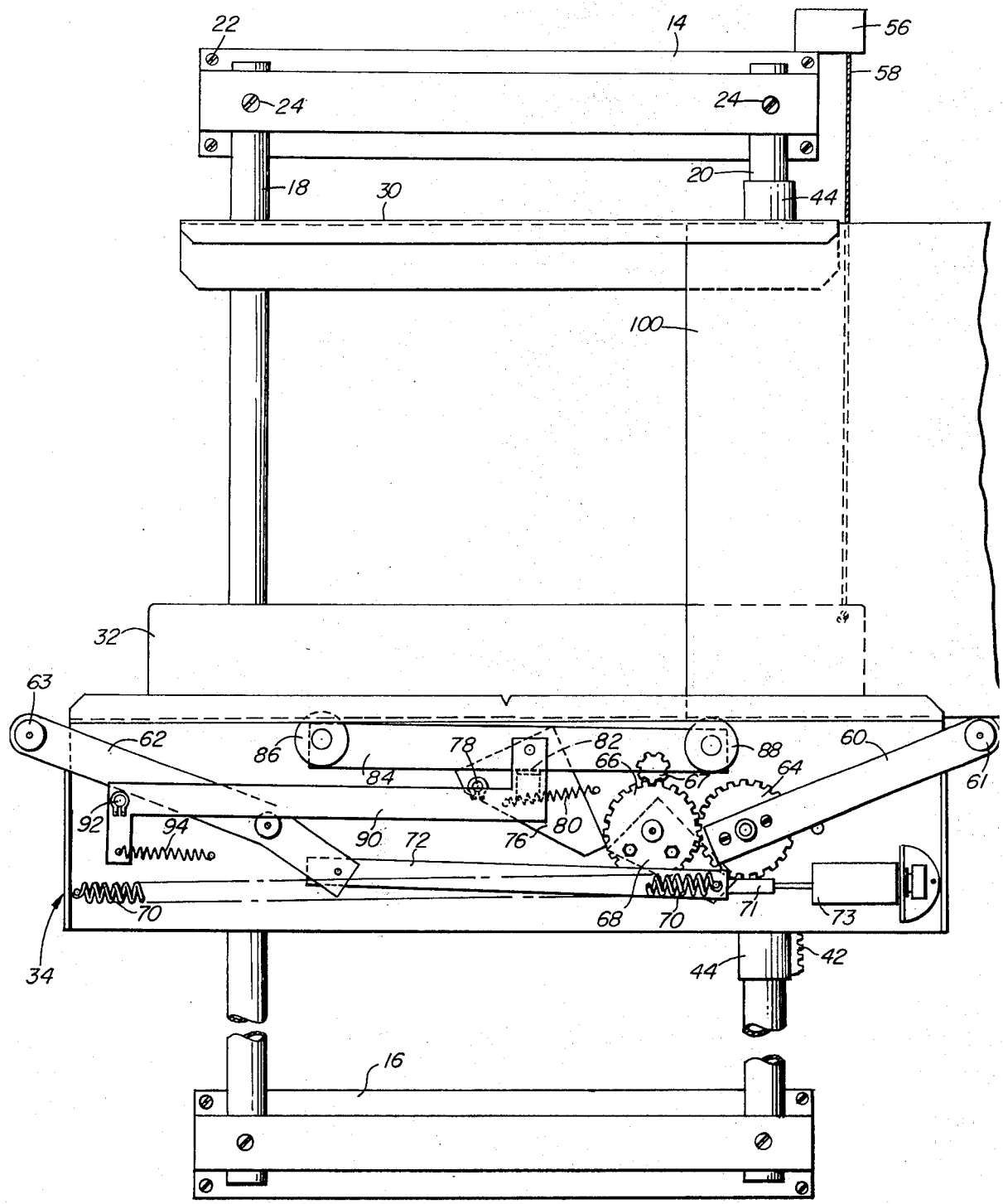
FIG. 6 is a front elevational view of the cassette holder shown in FIG. 1 as a cassette is being inserted therein.

Referring to the drawings wherein like characters of reference designate like parts throughout the several views, there is shown in FIGS. 1–5 a cassette holder 10, which may be of the wall mounted type, for example. Cassette holder 10 is provided with a generally rectangular support frame 12 having transverse end brackets, 14 and 16, respectively, and longitudinally extending support rods, 18 and 20, respectively. Each of the end brackets 14 and 16 may comprise a respective U-shaped channel member having at the opening thereof flanged terminal edge portions which may be suitably affixed, as by screws 22, for example, to a wall or like support structure. Each of the support rods 18 and 20 has respective end portions extending longitudinally through aligned apertures in the opposing side walls of the U-shaped channel members comprising end brackets 14 and 16, respectively, and are suitably secured therein, as by set screws 24, for example.

The support rod 18 is slidably engaged by longitudinally extending, U-shaped channel members 26 and 28, respectively, which are fixedly attached, as by welding, for example, to transversely extending guide tracks 30 and 32, respectively. The guide tracks 30 and 32 comprise respective U-shaped members having open sides disposed in parallel opposing relationship with one another. The lower guide track 32 carries a substantially coextensive and longitudinally extending support plate 36 of a lower track assembly 34. Fixedly attached to the plate 36, as shown in FIG. 5, is a bracket 38 which rotatably supports a pinion gear 40 in intermeshing relationship with a longitudinally extending rack 42. The rack 42 is carried on the lower end portion of a tubular member 44 which encircles the support rod 20 and extends slidably through the bracket 38. The upper end portion of tubular member 44 is fixedly attached, as by welding, for example, to the upper guide track 30.

The shaft of pinion gear 40 may have attached to one end thereof a suitable crank 46 for rotating the gear 40 and causing it to travel along the rack 42. As a result, the bracket 38 will slide along the tubular member 44; and the lower track 32 will move relative to the upper track 30. Accordingly, the pinion gear 40 and rack 42 provide adjustable means for spacing the tracks 30 and 32 apart a sufficient distance to achieve slidable engagement with respective opposing edges of an inserted cassette. Consequently, the shaft of pinion gear 40 may have fixedly attached to the other end thereof a spur gear 48 which intermeshes with an idler gear 50 to rotate a gear 52 of a potentiometer 54. Thus, rotation of pinion gear 40 to cause movement of the lower track 32 relative to the upper track 30 also causes rotation of a wiper arm (not shown) in potentiometer 54 to produce a corresponding electrical output signal.

Also, the tubular member 44, rack 42, and pinion gear 40 provide interconnecting means for sliding the upper and lower tracks 30 and 32 as a unit along the support rods 18 and 20 to a desired position, such as adjacent a selected portion of a patient's body, for example. To counteract the force of gravity, a counterweighing device 56 may be suitably supported on the upper end bracket 14. The device 56 may comprise a spring loaded pulley 57 having wound thereon a cable 58 which has one end fixedly attached to the lower track assembly 34. Also, a suitable locking means may be provided for maintaining the tracks 30 and 32 in a selected location on the support rods 18 and 20. The locking means may comprise a boss 45 provided on the tubular member 44 and having extending therethrough an internally threaded bore wherein a knurl headed screw 47 is journalled. Thus, by rotating the screw 47 until the inner end thereof binds against the support rod 20 the tracks 30 and 32 may be maintained in a selected position on the support rods 18 and 20.

With no cassette installed in the holder 10, rollers 61 and 63 rotatably mounted on distal end portions of pivotal arms 60 and 62, respectively, are disposed adjacent respective ends of the lower guide track 32 and slightly above the level thereof. The proximal end portion of pivotal arm 60 is fixedly attached to a driven gear 64 such that the arm 60 rotates with gear 64. The teeth of driver gear 64 intermesh with the teeth of a driving gear 66. Fixedly attached to the outer flat surface of gear 66 is a large end portion of a trapezoidal shaped pawl member 68, such that the pawl member rotates with the gear 66.

The smaller end portion of pawl member 68 projects outwardly from the gear 66 and has suitably secured to it a resilient driving means, such as one end of a coil spring 70 which has the other end anchored to support plate 36 for example. Pivotally attached to the smaller end portion of the pawl member 68 is an end portion of an elongated link 72 which has an opposing end portion pivotally attached to the proximal end portion of pivotal arm 62. Arm 62 is rotatable about a one end of a shaft 74 which has its opposing end fixedly attached to the support plate 36. Thus, the pivotal arms 60 and 62 are mechanically coupled to the pawl member 68 and the driving gear 62 to rotate in mutually opposite angular directions.

The large end portion of pawl member 68 has a sharp corner projecting outwardly from the driver gear 66 and is lockingly engaged by a corner portion at the small end of a trapezoidal shaped latch member 76. A corner portion at the larger end of latch member 76 is pivotally mounted on a shaft 78 which projects outwardly from the support plate 36. The latch member 76 is pivoted into locking engagement with the pawl member 68 by a coil spring 80 having one end suitably secured to the latch member 76 and an opposing end anchored to the support plate 36.

Latch member 76 is provided with a projecting tab 82 which is operatively disposed adjacent a sensing link 84 having rotatably disposed at respective end portions thereof sensing roller 86 and 88, respectively. A central portion of the link 84 is pivotally attached to one end of a generally Z-shaped arm 90. An opposing end portion of arm 90 is rotatable about a pin 92 projecting outwardly from the support plate 36. The arm 90 is suitably secured to one end of a coil spring 94 having its opposing end anchored to the support plate 36. Due to the spring 94, the arm 90 urges the rollers 86 and 88 toward respective aligned slots 96 and 98 in the lower track 32. As a result, chordal portions of the rollers 86 and 88 protrude into the lower track 32 to sense the insertion of a file cassette therein.

As shown in FIG. 6, a cassette 100 may be slidably inserted between the respective guide tracks 30 and 32 of the holder 10. As a result, the distal end of the adjacent pivotal arm, such as 60, for example, will be depressed slightly by the weight of the inserted cassette 100. Consequently, the driving gear 66 and the pawl member 68 will be rotated slightly in the counterclockwise direction as viewed in FIG. 6. Thus, pressure will be removed from the engaged corner of latch member 76 for subsequent disengagement, without unlocking the driving gear 66.

As shown in FIG. 6, continued insertion of the cassette 100 depresses the first encountered sensing roller, such as 88, for example. As a result, the sensing link 84 pivots slightly about its central portion thereby bringing the lower edge thereof closer to the tab 82 projecting from the latch member 76. However, the link 84 does not engage the tab 82 with sufficient force to rotate the latch member 76 and unlock the driving gear 66.

Figure 7:
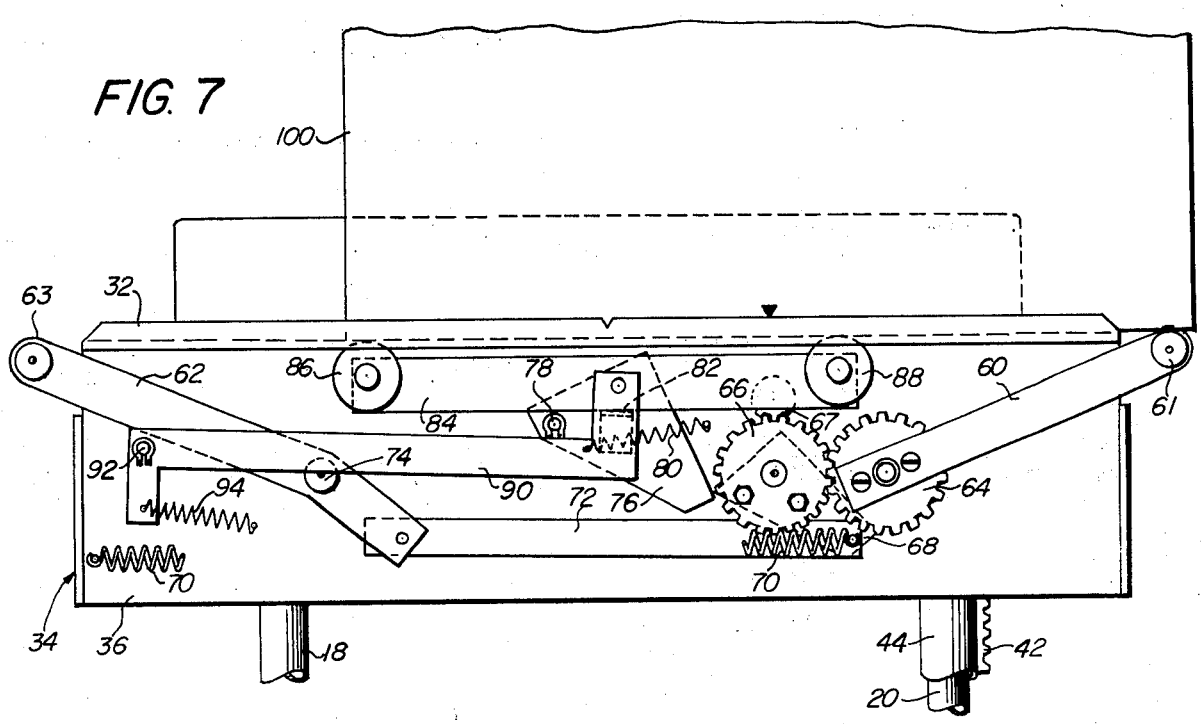
FIG. 7 is a fragmentary elevational view of the cassette holder shown in FIG. 1 with the cassette inserted still further therein.

As shown in FIG. 7, further insertion of the cassette 100 depresses the second encountered sensing roller, such as 86, for example. As a result, the Z-shaped arm pivots about the shaft 92, and the lower edge of link 84 bears against the tab 82 with sufficient force to rotate the latch member 76 clockwise as viewed in FIG. 7. Consequently, the formerly engaged corner of latch member 76 clears the formerly engaged corner of pawl member 68. Thus, the spring 70 is free to rotate the pawl member 68 and the driving gear 66 in the clockwise direction as viewed in FIG. 8.

Figure 8:
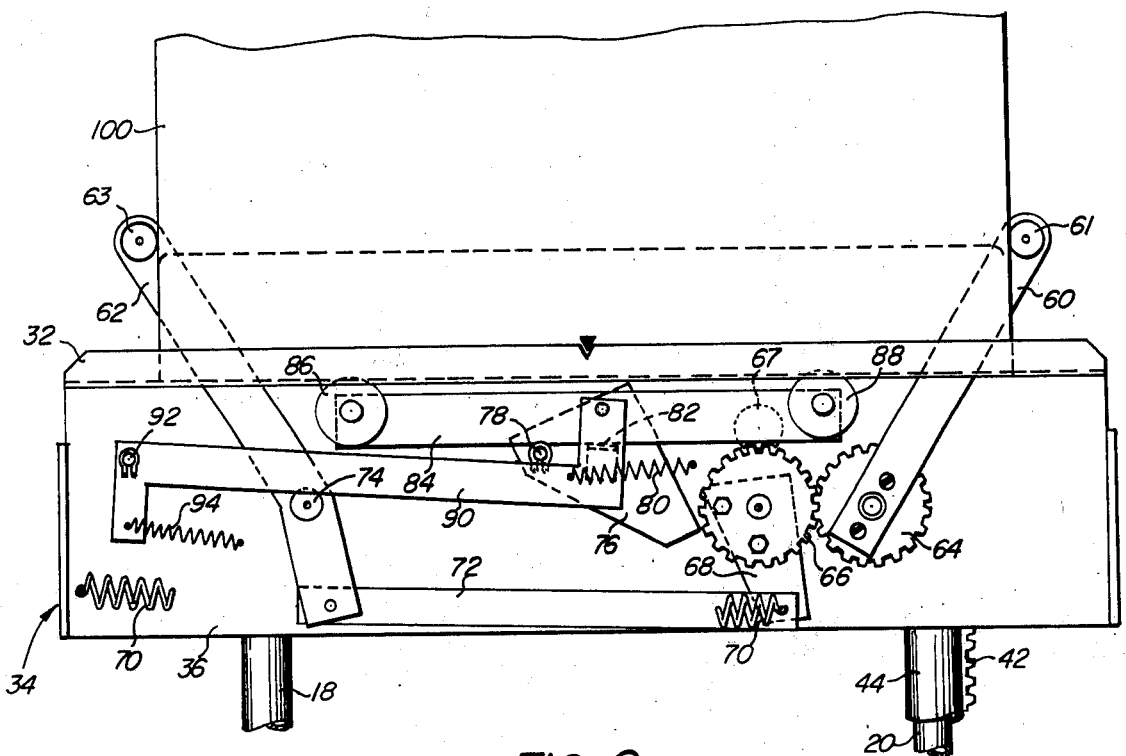
FIG. 8 is a fragmentary elevational view of the cassette holder shown in FIG. 1 with the cassette centered transversely therein.

When the trailing edge of the inserted cassette passes over the depressed distal end of the adjacent pivotal arm, such as 60, for example, the spring 70 rotates the pawl member 68 and the driving gear 66 clockwise. As a result, the distal ends of pivotal arms 60 and 62, respectively, swing arcuately toward one another over the lower guide track 32; and the rollers 61 and 63 carried on the respective distal ends engage opposing sides of the inserted cassette 100. Due to the force exerted by the common resilient driving means, spring 70, the rollers 61 and 63, exert respective equal pressures on the engaged sides of the cassette 100 thereby centering the cassette transversely in holder 10, as shown in FIG. 8.

Referring again to FIG. 1, the small end portion of pawl member 68 may have suitably attached thereto one end of a plunger 71 which extends slidably into the cylinder of a dashpot 73 which has its opposing end pivotally mounted to support plate 36. Thus, the dashpot 73 provides a cushioning effect so that the rollers 61 and 63 do not engage the opposing sides of cassette 100 with excessive force. Also, the driving gear 66 may be suitably coupled, to a gear 67 which rotates the wiper arm (not shown) of a potentiometer 69. Consequently, the potentiometer 69 will measure the counterclockwise rotation of driving gear 66 necessary to center the cassette 100, and will produce a corresponding output signal indicative of the transverse dimension of the installed cassette 100. Moreover, the link 72 may have a rounded corner thereof disposed adjacent an actuating arm of a microswitch 75 mounted on the support plate 36. Accordingly, when the clockwise rotation of pawl member 68 moves the link 72 in the lateral direction to rotate pivotal arm 62, the link 72 will engage the actuating arm of switch 75 to close it and thereby produce an electrical signal indicative of a cassette being installed in holder 10.

Removal of the cassette 100 from either side of the holder 10 causes the distal ends of pivotal arms 60 and 62 to rotate arcuately away from one another due to the resulting counterclockwise rotation of driving gear 66. The cassette will release sensing rollers 86 and 88, respectively, to protrude back into the lower guide track 32. As a result, the spring 80 will rotate the latch member 76 counterclockwise into a position to lockingly engage the pawl member 68. Also, the pawl member 68 will move the link 72 laterally to a position where the link 72 no longer engages the actuating arm of switch 75 thereby producing an electrical signal indicative of no cassette installed in holder 10. Thus, the holder 10 is restored to a condition for slidably receiving another cassette and automatically centering it transversely in the holder 10, without requiring a patient to move away from the holder.

From the foregoing, it will be apparent that all of the objectives of this invention have been achieved by the structures shown and described. It also will be apparent, however, that various changes may be made by those skilled in the art without departing from the spirit of the invention as expressed in the appended claims. It is to be understood, therefore, that all matter shown and described is to be interpreted as illustrative and not in a limiting sense.

What is claimed is:

1. A film cassette holder comprising
   a support member;
   a pair of substantially parallel, opposing guide tracks operatively disposed on the support member for insertion of a cassette therebetween;
   a pair of spaced pivotal clamping arms operatively disposed with respect to the guide tracks and suitably spaced apart for closing on opposing sides of the cassette; and
   cassette positioning means operatively connected to the clamping arms for rotating the arms in respective opposite angular directions to exert substantially equal pressures on opposing sides of the cassette and thus position it transversely in the holder.

2. A film cassette holder as set forth in claim 1 wherein the cassette positioning means includes a common drive means operatively coupled to both of the clamping arms for rotating the arms in respective opposite angular directions to close on opposing sides of the cassette.

3. A film cassette holder as set forth in claim 2 wherein the cassette positioning means includes a locking means operatively disposed with respect to the drive means for disabling the drive means when no cassette is installed in the holder.

4. A film cassette holder as set forth in claim 3 wherein the cassette positioning means includes mechanical sensing means operatively disposed with respect to one of the guide tracks and the locking means for determining sufficient insertion of the cassette and activating the locking means to unlock the driving means.

5. A film cassette holder as set forth in claim 4 wherein the driving means includes a spring loaded rotatable member operatively coupled to both of the clamping arms.

6. A film cassette holder as set forth in claim 5 wherein the locking means includes a pivotal latch member operatively disposed for lockingly engaging the spring loaded rotatable member.

7. A film cassette holder as set forth in claim 6 wherein the sensing means includes a pivotal sensing link operatively disposed adjacent a portion of the latch member and having spaced portions extended into the guide track.

8. A film cassette holder as set forth in claim 1 and including an electrical sensing means operatively connected to the cassette sensing means for measuring the transverse dimension of the cassette and producing a corresponding electrical signal.

* * * * *